(12) United States Patent
Miya et al.

(10) Patent No.: US 6,961,989 B2
(45) Date of Patent: Nov. 8, 2005

(54) STATOR DEVICE

(75) Inventors: Taiichi Miya, Tokyo (JP); Naohiko Aoyama, Tokyo (JP)

(73) Assignee: Minebea Co., Ltd., (JP)

( * ) Notice: Subject to any disclaimer, the term of this patent is extended or adjusted under 35 U.S.C. 154(b) by 0 days.

(21) Appl. No.: 10/969,710

(22) Filed: Oct. 20, 2004

(65) Prior Publication Data

US 2005/0052086 A1     Mar. 10, 2005

Related U.S. Application Data

(62) Division of application No. 10/628,688, filed on Jul. 28, 2003, now Pat. No. 6,831,386.

(30) Foreign Application Priority Data

Jul. 30, 2002   (JP) .............................. 2002-221801

(51) Int. Cl.[7] .................... H02K 11/00; H02K 15/00
(52) U.S. Cl. ........................... 29/596; 29/598; 29/605; 310/71
(58) Field of Search ..................... 29/596–598, 605; 310/91, 260, 270, 71

(56) References Cited

U.S. PATENT DOCUMENTS 3,834,014 A  *  9/1974  Burr et al. ..................... 29/598
6,114,786 A  *  9/2000  Ishida et al. .................. 310/71

* cited by examiner

Primary Examiner—Tran Nguyen
(74) Attorney, Agent, or Firm—Schulte Roth & Zabel, LLP; Joel E. Lutzker; Anna Vishev

(57) ABSTRACT

A stator device which prevents the formation of varnish accumulations on jumper wires, thereby preventing jumper wire breakage due to temperature variations. A gap is created between the jumper wire and the stud located on the stator body. When varnish is applied to the stud and the jumper wires, excess varnish flows through the gap and pools underneath. Moreover, when there is a significant accumulation of varnish in the gap, the varnish will flow off from the edge of the stator body.

2 Claims, 4 Drawing Sheets

STATOR DEVICE

CROSS-REFERENCE TO RELATED APPLICATIONS

This application is a divisional of application Ser. No. 10/628,688, filed Jul. 28, 2003 now U.S. Pat. No. 6,831,386. Application Ser. No. 10/628,688 claims priority from Japanese Patent Application No. 2002-221801, filed Jul. 30, 2002.

FIELD OF THE INVENTION

The present invention relates to stator devices used in resolvers, motors, and other rotary electrical equipment, and more particularly to a stator device that is configured to prevent the breaking of stator jumper wires caused by the varnish that is used to fix stator coil wires.

BACKGROUND OF THE INVENTION

FIG. 7 shows a VR (variable reluctance) resolver in which a rotor R is disposed on the inside of a prior art stator S. FIGS. 8–11 show other views of the prior art stator, portions thereof and other variations of portions of prior art stators. The stators shown in these figures essentially comprise a plurality of magnetic protuberances or teeth 2 disposed on the inner periphery of a stator body having a ring-shaped stator stack 1. A wire is wound around each of these magnetic teeth 2 to form the stator coil wire 3. As shown in FIGS. 7–9, an insulator 4 is formed on the outer and rear surfaces of the stator stack 1 and the magnetic teeth 2. A plurality of studs 5 project from the surface of the insulator 4. As shown in FIG. 9, wires 6 (hereinafter "jumper wires 6") extend between stator coil wires 3 of adjacent magnetic teeth 2, extend behind studs 5 and rest on the outside of the studs 5. In practice, a continuous wire is wrapped around a magnetic protuberance 2, extended behind stud 5 and wrapped around at least the next adjacent magnetic protuberance 2. When the stator coil wires 3 are completely wound over the required number of continuous magnetic teeth 2, the wires are wrapped and fixed around output pins 8 that are provided. FIGS. 10 through 13 show views of examples of prior art studs 5.

In the prior art stator devices S discussed above, varnish is applied to the coil after the completion of coil winding in order to protect and fix the stator coil wires 3. Varnish is also applied to the jumper wires 6 that connect the stator coil wires 3. However, when varnish is applied, varnish accumulations 9, as shown in FIG. 14, tend to form in the corners of the jumper wires 6 and the studs 5. As a result, breaks in the jumper wires 6 can occur due to temperature fluctuations and the effect of differences in the coefficient of thermal expansion of the varnish accumulations 9 and the jumper wires 6.

SUMMARY OF THE INVENTION

Therefore, an object of this invention is to prevent varnish accumulations in a stator device.

Another object of this invention is to prevent wire breakage induced by temperature fluctuations by preventing the accumulation of varnish.

Another object of this invention is to prevent varnish accumulation by providing a space between the jumper wire and at least one of a supporting stud and a stator body.

Accordingly, in a first aspect of the present invention, a stator device is provided including a stator body having at least a pair of magnetic protuberances for supporting a wound wire, at least one stud disposed between the at least a pair of magnetic protuberances, a jumper wire extending behind the at least one stud and connecting the at least a pair of magnetic protuberances, and an abutment extending from the at least one stud to support the jumper wire and form a gap between the jumper wire and the stud to permit an applied varnish to flow out through the gap.

In the stator device configured as above, varnish accumulations do not form since the varnish flows toward the edge area of the stator from the gap that is formed between the stud and the jumper wire when the varnish is applied. Therefore, jumper wire breakage due to temperature variations can be effectively prevented.

In another aspect of the present invention, the abutment comprises first and second laterally spaced ribs extending from a wall of the stud. Each of the ribs may also extend from the stud wall in a shape resembling an approximately right-angled triangle, so that the jumper wire is supported by the oblique side [hypotenuse] of this approximately right-angled triangle. The oblique sides of the approximately right-angled triangles may be slightly concave to ensure that the wire will come to rest in the center area of the ribs.

By placing the wires on these ribs, a gap is formed between the jumper wire and the studs. A gap is also formed between the jumper wire and an edge of the stator body.

In still another aspect of the present invention, a single rib is provided approximately in the center area of each of the studs. The studs may extend from an insulator portion of the stator body, and the single rib may project from the stator body to an outer periphery of the insulator portion. The single rib may also have some of the other features of the laterally spaced ribs, as described above.

Further features and advantages of the invention will become evident to one skilled in the art upon reading of the detailed description of the invention, which is given below by way of example only and with reference to the accompanying drawings, and the scope of the invention will be indicated in the claims.

BRIEF DESCRIPTION OF THE DRAWINGS

For a fuller understanding of the invention, reference is made to the following description, taken in connection with the accompanying drawings, in which.

DETAILED DESCRIPTION

Figure 1:
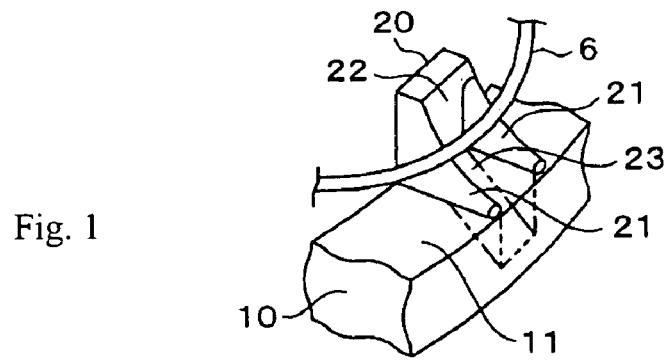
FIG. 1 is a perspective view of the principle components of an embodiment of the stator device of the present invention.
Figure 2:
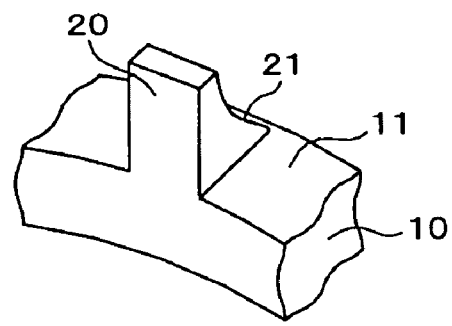
FIG. 2 is a perspective view from the opposite side of the view shown in FIG. 1.
Figure 7:
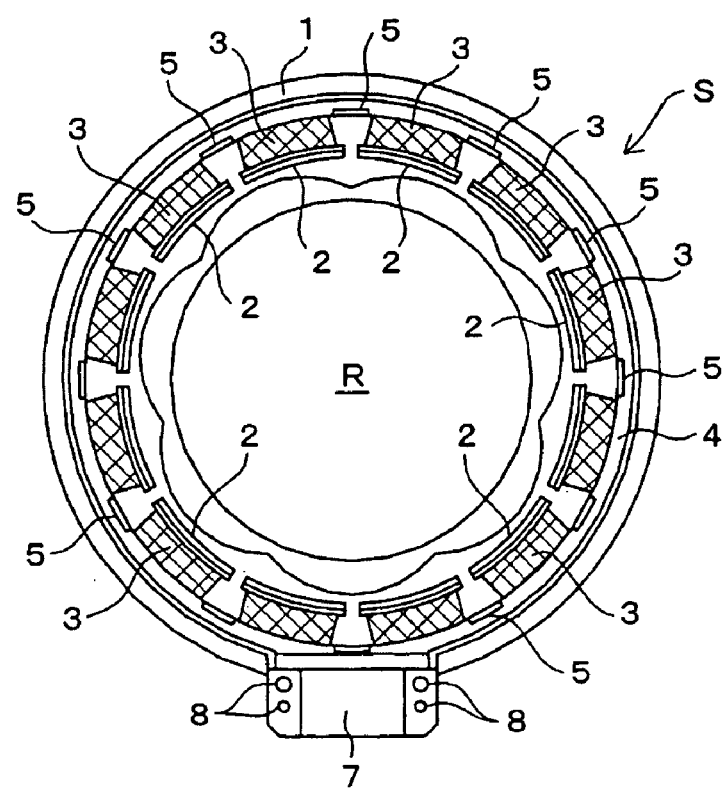
FIG. 7 is a plan view of a prior art stator device.
Figure 8:
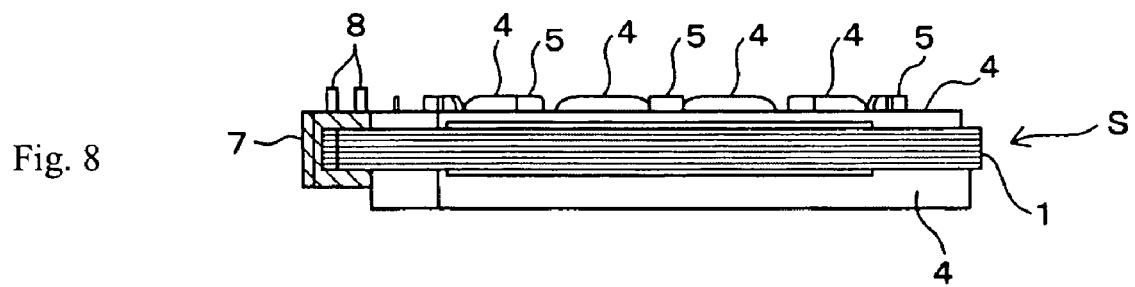
FIG. 8 is a side view of a prior art stator device.
Figure 9:
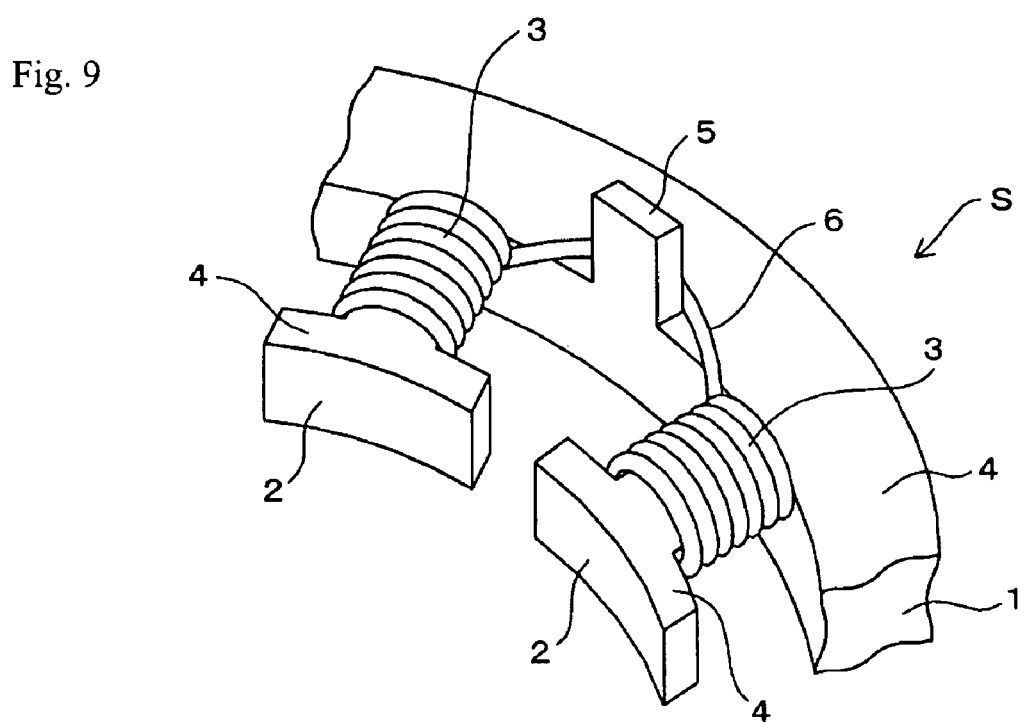
FIG. 9 is a perspective view of a portion of a prior art stator device showing a stud and a pair of magnetic teeth extending from an insulator of the stator body.
Figure 10:
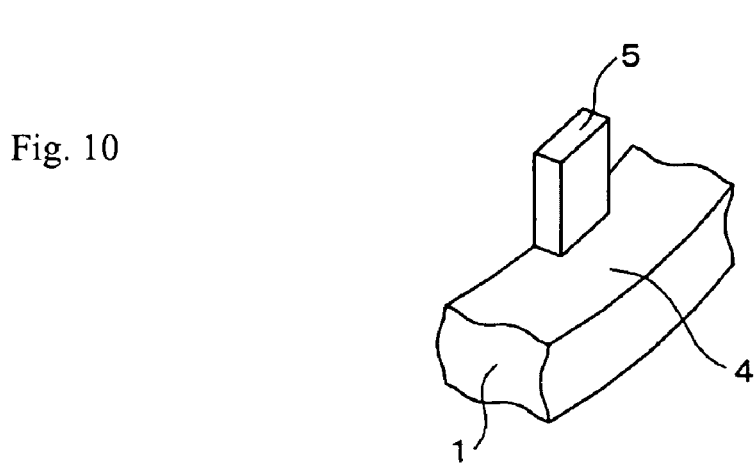
FIG. 10 is a perspective drawing showing the stud area of the stator device shown in FIG. 9.
Figure 11:
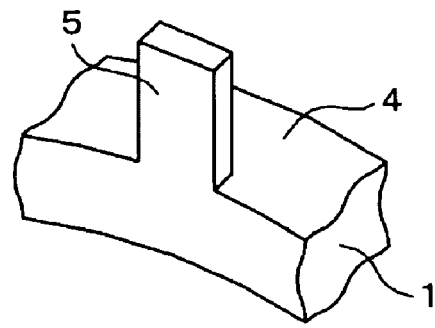
FIG. 11 is a perspective view from the opposite side of the view shown in FIG. 10.
Figure 12:
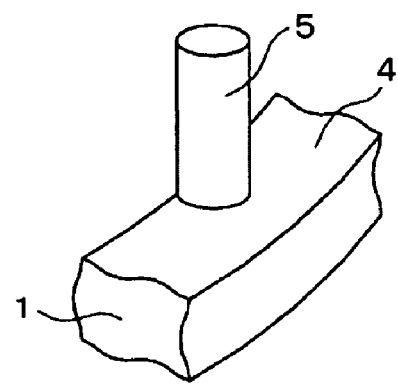
FIG. 12 is a perspective view showing the stud area of another prior art stator device.
Figure 13:
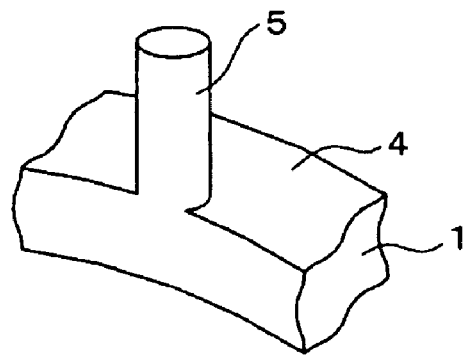
FIG. 13 is a perspective view from the opposite side of the view shown in FIG. 12.
Figure 14:
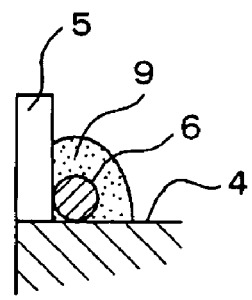
FIG. 14 is a cross-sectional view of the stud are of a prior art stator device including a jumper wire coated with varnish.

The following explanation of a first embodiment of this invention is made with reference to FIGS. 1 and 2. The stator device of this embodiment is in most respects similar in design to the prior art stator device shown in FIGS. 7–9 except as otherwise indicated. The following description focuses on the main components of the present embodiment, with other components designated by the same reference numbers as those used in FIGS. 7–9.

In FIGS. 1 and 2, reference number 10 identifies the stator body and reference number 11 identifies the insulator. Studs (upraised parts) 20 are formed between pairs of magnetic teeth or protuberances 2 along an upper edge of the insulator 11. Each stud 20 consists of a short plate having a rear surface or wall that faces the jumper wire 6 and a front surface. The studs 20 include laterally spaced projecting ribs 21 extending from opposite sides of the rear surface of the stud 20, which ribs run from the top edge of the stud 20 to the end surface of the insulator 11. Viewed from the side, each of the ribs 21 forms an approximately right-angled triangle with a slight concavity formed in the oblique side.

The oblique sides of the ribs 21 provide a support against which the jumper wires 6 rest as shown in FIG. 1. The jumper wires 6 are connected to stator coil wires on adjacent magnetic teeth or protuberances 2. Preferably, the jumper wires 6 are supported in the middle of the ribs 21, thus forming gap 22 between the jumper wire 6 and the stud 20 and gap 23 between the jumper wire 6 and the insulator 11.

After coil winding is completed, varnish is applied to the stator coil wires 3 and to the area near the inner periphery of the edge of the insulator 11 of the stator device configured as above. When varnish is applied to the stud 20 and the jumper wire 6 shown in FIG. 1, the excess varnish flows down through the gap 22 created between the jumper wire 6 and the stud 20, accumulating in the gap 23, below. Also, when a substantial amount of varnish has accumulated in the gap 23, the varnish will drip out from the edge of the insulator 11. Therefore, the breakage of jumper wires 6 due to temperature variations can effectively be prevented because there is no varnish accumulation around the jumper wires 6.

In the above embodiment, ribs 21 are formed on both sides of the stud 20, and the ribs 21 are provided with a slight concavity on their oblique sides, so that a large gap 22 is formed between the jumper wire 6 and the stud 20, and the jumper wire 6 is held in the central portions of the ribs 21 so that a gap 23 is also created between the jumper wire and the edge of the insulator 11. Thus, the formation of varnish accumulations can be effectively prevented.

Figure 3:
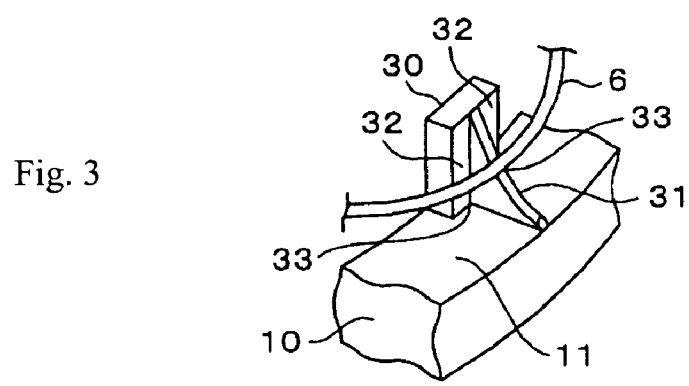
FIG. 3 is a perspective view of another embodiment of the stator device of the present invention.
Figure 4:
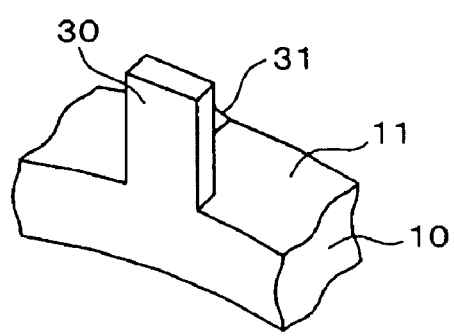
FIG. 4 is a perspective view from the opposite side of the view shown in FIG. 3.

FIGS. 3 and 4 show a different embodiment of this invention. In this variation, the studs are cylindrical in shape and only one rib 31 extends from a central portion of each of the studs 30 in a circumferential direction. In this embodiment of the invention, a gap 32 is formed between the jumper wire 6 and the stud 30, and a gap 33 is also formed between the jumper wire 6 and the edge of the insulator 11. Thus, approximately the same effect as in the embodiment described above is obtained.

Figure 5:
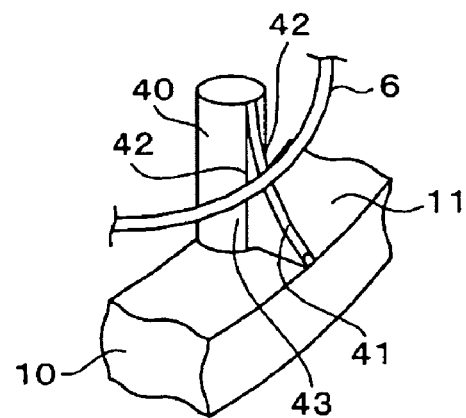
FIG. 5 is a perspective view of still another embodiment of the stator device of the present invention.
Figure 6:
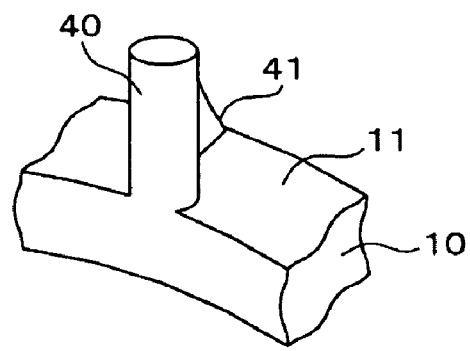
FIG. 6 is a perspective view from the opposite side of the view shown in FIG. 5.

FIGS. 5 and 6 show other variations of the above embodiment. In these variations, the stud 40 is formed in a cylindrical shape, and a single rib 41 that is equivalent to the above rib 31 is formed in the central portion in the circumferential direction of the stud 40. Like the other embodiments, in this embodiment, a gap 42 is formed between the jumper wire 6 and the stud 40 and a gap 43 is formed between the jumper wire 6 and the edge of the insulator 11. Thus, a similar effect as in the embodiments described above can be obtained.

This invention is not limited to the above embodiments; a number of variations are possible. For example, although a slight concavity is formed in the oblique side of the ribs 21, rib 31 and rib 41, the oblique side in each of these embodiments can also be a straight line. Also, there is no requirement that the ribs 21, rib 31 and rib 41 be right-angled triangles; they can be rectangular in shape. In this case, a concavity can be formed in the midpoint of the height of the rib or ribs so as to engage the jumper wire 6. Moreover, as shown in the dotted line in FIG. 1, a cutout 50 can be made in the insulator 11 to facilitate the run-out of excess varnish to the insulator 11. Conversely, a dam can be placed between the rib 21 shown in FIG. 1 and the bottom edge so that the varnish which runs down pools at this location. Although varnish accumulations may form here, as long accumulation is at some distance from the jumper wires, it would present no impediment.

As described above, the effect of this invention is to prevent varnish accumulations, thereby preventing jumper wire breakage due to temperature variations by creating a gap in the area where the studs and a surface of the insulator contact the wires, allowing the excess varnish to run out toward the edge of the stator body.

While particular embodiments of the present invention have been described, it will be apparent to those skilled in the art that changes and modifications may be made without departing from this invention in its broader aspect and, therefore, the appended claims are to encompass within their scope all such changes and modifications that fall within the true sprit and scope of this invention.

What is claimed is:

1. In a stator device having a stator body provided with a plurality of magnetic protuberances for supporting a wound wire, studs disposed between the plurality of magnetic protuberances and jumper wires that connect at least two adjacent magnetic protuberances and extend behind the studs, a method of winding a wire and applying a varnish to the wound wire comprising the steps of:

winding the wire around the magnetic protuberances;

spacing the jumper wires from at least one of the studs and the stator body wherein the studs include an abutment for spacing the jumper wire from the stud; and applying a varnish to the wire such that excess varnish applied to the jumper wires flows through the spacing formed by the abutment provided between the jumper wires and at least one of the studs and the stator body.

2. The method according to claim 1 wherein the abutment is at least one sloping wall for spacing the jumper wire from the stator body and the stud.

* * * * *